US008538132B2

(12) United States Patent
Kessler et al.

(10) Patent No.: US 8,538,132 B2
(45) Date of Patent: Sep. 17, 2013

(54) COMPONENT CONCENTRICITY

(75) Inventors: Patrick Kessler, San Francisco, CA (US); Bartley K. Andre, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 395 days.

(21) Appl. No.: 12/889,987

(22) Filed: Sep. 24, 2010

(65) Prior Publication Data
US 2012/0076363 A1 Mar. 29, 2012

(51) Int. Cl.
*G06K 9/00* (2006.01)

(52) U.S. Cl.
USPC .............................................. 382/151; 348/94

(58) Field of Classification Search
USPC ................... 382/141, 151, 152, 286; 348/86, 348/94, 95; 356/614, 399, 400, 401
See application file for complete search history.

(56) References Cited

U.S. PATENT DOCUMENTS

| | | | |
|---|---|---|---|
| 3,363,104 A | 1/1968 | Waite et al. .................... 250/199 |
| 3,761,947 A | 9/1973 | Volkmann et al. .......... 346/33 R |
| 4,620,222 A | 10/1986 | Baba et al. ....................... 358/48 |
| 4,691,366 A * | 9/1987 | Fenster et al. .................. 382/54 |
| 4,823,194 A * | 4/1989 | Mishima et al. .............. 358/282 |
| 4,992,666 A * | 2/1991 | Robertson ..................... 250/561 |
| 5,086,478 A * | 2/1992 | Kelly-Mahaffey et al. ....... 382/8 |
| 5,272,473 A | 12/1993 | Thompson et al. ................ 345/7 |
| 5,274,494 A | 12/1993 | Rafanelli et al. .............. 359/327 |
| 5,283,640 A | 2/1994 | Tilton ............................. 348/42 |
| 5,337,081 A | 8/1994 | Kamiya et al. .................. 348/61 |
| 5,625,408 A | 4/1997 | Matsugu et al. ................. 348/42 |
| 5,748,199 A | 5/1998 | Palm ............................. 345/473 |
| 5,757,423 A | 5/1998 | Tanaka et al. ................. 348/218 |
| 6,002,423 A | 12/1999 | Rappaport et al. .............. 348/42 |
| 6,043,838 A | 3/2000 | Chen ............................... 348/42 |
| 6,215,898 B1 | 4/2001 | Woodfill et al. .............. 382/154 |
| 6,282,655 B1 | 8/2001 | Given .......................... 713/200 |
| 6,310,662 B1 | 10/2001 | Sunakawa et al. ............ 348/747 |
| 6,339,429 B1 | 1/2002 | Schug ........................... 345/589 |
| 6,389,153 B1 | 5/2002 | Imai et al. ..................... 382/106 |
| 6,416,186 B1 | 7/2002 | Nakamura ...................... 353/69 |
| 6,421,118 B1 * | 7/2002 | Shaar .......................... 356/73.1 |
| 6,456,339 B1 | 9/2002 | Surati et al. ................... 348/745 |

(Continued)

FOREIGN PATENT DOCUMENTS
| | | |
|---|---|---|
| EP | 167314 B1 | 1/1990 |
| EP | 2053844 A1 | 4/2009 |

(Continued)

OTHER PUBLICATIONS

Author Unknown, "YCbCr," http://en.wikipedia.org/wiki/Y%27CbCr, 4 pages, at least as early as Jun. 17, 2010.

(Continued)

*Primary Examiner* — Andrew W Johns
(74) *Attorney, Agent, or Firm* — Dorsey & Whitney LLP

(57) ABSTRACT

System and methods for determining a concentricity of a component mounted within an aperture of an electronic device housing. In particular, a method for determining concentricity of a camera includes obtaining an image of a camera mounted within the aperture of the housing and identifying a plurality of circular shapes within the image using a processor. One of the circular shapes represents the aperture in the housing and the other circular shape represents the camera. An offset between two of the plurality of circular shapes is calculated.

13 Claims, 8 Drawing Sheets

(56) References Cited

U.S. PATENT DOCUMENTS

| | | |
|---|---|---|
| 6,516,151 B2 | 2/2003 | Pilu .................................. 396/106 |
| 6,525,772 B2 | 2/2003 | Johnson et al. ................. 348/383 |
| 6,560,711 B1 | 5/2003 | Given et al. ..................... 713/200 |
| 6,561,654 B2 | 5/2003 | Mukawa et al. .................. 353/31 |
| 6,614,471 B1 | 9/2003 | Ott .................................... 348/238 |
| 6,618,076 B1 | 9/2003 | Sukthankar et al. ............ 348/180 |
| 6,636,292 B2 | 10/2003 | Roddy et al. ..................... 355/32 |
| 6,807,010 B2 | 10/2004 | Kowarz ............................. 359/634 |
| 6,862,022 B2 | 3/2005 | Slupe ................................ 345/207 |
| 6,862,035 B2 | 3/2005 | Jeong et al. ....................... 348/42 |
| 6,877,863 B2 | 4/2005 | Wood et al. ........................ 353/70 |
| 6,903,880 B2 | 6/2005 | Beatson et al. ................... 359/722 |
| 6,921,172 B2 | 7/2005 | Ulichney et al. .................. 353/69 |
| 6,924,909 B2 | 8/2005 | Lee et al. ............................ 358/1.9 |
| 6,930,669 B2 | 8/2005 | Weiner et al. ..................... 345/156 |
| 6,931,601 B2 | 8/2005 | Vronay et al. .................... 715/767 |
| 6,970,080 B1 | 11/2005 | Crouch et al. ............... 340/539.26 |
| 7,028,269 B1 | 4/2006 | Cohen-Solal et al. ........... 715/863 |
| 7,058,234 B2 | 6/2006 | Gindele et al. .................. 382/274 |
| 7,079,707 B2 | 7/2006 | Baron ................................ 382/289 |
| 7,103,212 B2 | 9/2006 | Hager et al. ...................... 382/154 |
| 7,123,292 B1 | 10/2006 | Seeger et al. .................. 348/218.1 |
| 7,123,298 B2 | 10/2006 | Schroeder et al. ............... 348/273 |
| 7,307,709 B2 | 12/2007 | Lin et al. ........................... 356/128 |
| 7,352,913 B2 | 4/2008 | Karuta et al. ..................... 382/275 |
| 7,370,336 B2 | 5/2008 | Husain et al. .................... 719/328 |
| 7,413,311 B2 | 8/2008 | Govorkov et al. ................. 353/34 |
| 7,453,510 B2 | 11/2008 | Kolehmainen et al. ......... 348/340 |
| 7,460,179 B2 | 12/2008 | Pate et al. ......................... 348/602 |
| 7,483,065 B2 | 1/2009 | Gruhlke et al. .................. 348/277 |
| 7,512,262 B2 | 3/2009 | Criminisi et al. ................ 382/154 |
| 7,551,771 B2 | 6/2009 | England, III .................... 382/154 |
| 7,561,731 B2 | 7/2009 | Wallace et al. ................... 382/154 |
| 7,567,271 B2 | 7/2009 | Berestov ........................... 348/48 |
| 7,570,881 B2 | 8/2009 | Perala et al. ...................... 396/162 |
| 7,590,335 B2 | 9/2009 | Kobayashi et al. ............... 396/50 |
| 7,590,992 B2 | 9/2009 | Koplar et al. ..................... 725/23 |
| 7,598,980 B2 | 10/2009 | Imai et al. ..................... 348/208.4 |
| 7,613,389 B2 | 11/2009 | Suzuki et al. ..................... 396/89 |
| 7,629,897 B2 | 12/2009 | Koljonen ..................... 340/825.19 |
| 7,641,348 B2 | 1/2010 | Yin et al. .......................... 353/119 |
| 7,643,025 B2 | 1/2010 | Lange ............................... 345/419 |
| 7,653,304 B2 | 1/2010 | Nozaki et al. .................... 396/430 |
| 7,658,498 B2 | 2/2010 | Anson .............................. 353/69 |
| 7,834,846 B1 | 11/2010 | Bell ................................... 345/156 |
| 7,869,204 B2 | 1/2011 | Bair et al. ...................... 361/679.3 |
| 7,901,084 B2 | 3/2011 | Willey et al. ..................... 353/49 |
| 7,925,077 B2 | 4/2011 | Woodfill et al. ................. 382/154 |
| 7,964,835 B2 | 6/2011 | Olsen et al. ................... 250/208.1 |
| 8,044,880 B2 | 10/2011 | Nakamura et al. .............. 345/30 |
| 8,319,822 B2 | 11/2012 | McClatchie ...................... 348/33 |
| 2002/0021288 A1 | 2/2002 | Schug .............................. 345/169 |
| 2003/0038927 A1 | 2/2003 | Alden ............................... 353/122 |
| 2003/0086013 A1 | 5/2003 | Aratani ............................. 348/335 |
| 2003/0117343 A1 | 6/2003 | Kling ................................ 345/32 |
| 2004/0119988 A1* | 6/2004 | Chen et al. ....................... 356/615 |
| 2004/0189796 A1 | 9/2004 | Ho et al. ........................... 348/51 |
| 2004/0193413 A1 | 9/2004 | Wilson et al. .................... 704/243 |
| 2005/0132408 A1 | 6/2005 | Dahley et al. .................... 725/80 |
| 2005/0146634 A1 | 7/2005 | Silverstein et al. .............. 348/360 |
| 2005/0168583 A1 | 8/2005 | Thomason .................... 348/208.4 |
| 2005/0182962 A1 | 8/2005 | Given et al. ...................... 713/200 |
| 2005/0237385 A1 | 10/2005 | Kosaka et al. .................... 348/42 |
| 2005/0280786 A1 | 12/2005 | Moiroux et al. ................. 353/119 |
| 2006/0002605 A1* | 1/2006 | Chang et al. ..................... 382/141 |
| 2006/0140452 A1 | 6/2006 | Raynor et al. .................... 382/115 |
| 2006/0197843 A1 | 9/2006 | Yoshimatsu .................. 348/219.1 |
| 2006/0218781 A1* | 10/2006 | Nakamura et al. .............. 29/834 |
| 2007/0027580 A1 | 2/2007 | Ligtenberg et al. ............. 700/300 |
| 2007/0177279 A1 | 8/2007 | Cho et al. ......................... 359/692 |
| 2007/0236485 A1 | 10/2007 | Trepte .............................. 345/207 |
| 2007/0300312 A1 | 12/2007 | Chitsaz et al. ................... 726/34 |
| 2008/0062164 A1 | 3/2008 | Bassi et al. ....................... 345/214 |
| 2008/0131107 A1 | 6/2008 | Ueno ................................ 396/50 |
| 2008/0158362 A1 | 7/2008 | Butterworth .................... 348/187 |
| 2008/0191864 A1 | 8/2008 | Wolfson ........................... 340/524 |
| 2009/0008683 A1 | 1/2009 | Nishizawa ....................... 257/292 |
| 2009/0015662 A1 | 1/2009 | Kim et al. ......................... 348/43 |
| 2009/0027337 A1 | 1/2009 | Hildreth ........................... 345/158 |
| 2009/0051797 A1 | 2/2009 | Yao ................................... 348/308 |
| 2009/0079734 A1 | 3/2009 | McDaniel ........................ 345/419 |
| 2009/0115915 A1 | 5/2009 | Steinberg et al. ................ 348/745 |
| 2009/0116732 A1 | 5/2009 | Zhou et al. ....................... 382/154 |
| 2009/0221368 A1 | 9/2009 | Yen et al. .......................... 463/32 |
| 2009/0262306 A1 | 10/2009 | Quinn et al. ..................... 353/25 |
| 2009/0262343 A1 | 10/2009 | Archibald ........................ 356/246 |
| 2009/0273679 A1 | 11/2009 | Gere et al. ........................ 348/187 |
| 2009/0309826 A1 | 12/2009 | Jung et al. ........................ 345/156 |
| 2010/0060803 A1 | 3/2010 | Slack et al. ....................... 348/744 |
| 2010/0061659 A1 | 3/2010 | Slack et al. ....................... 382/295 |
| 2010/0073499 A1 | 3/2010 | Gere ................................ 348/222.1 |
| 2010/0079426 A1 | 4/2010 | Pance et al. ...................... 345/207 |
| 2010/0079468 A1 | 4/2010 | Pance et al. ...................... 345/501 |
| 2010/0079653 A1 | 4/2010 | Pance ............................... 348/333.1 |
| 2010/0079884 A1 | 4/2010 | Gere ................................. 359/887 |
| 2010/0083188 A1 | 4/2010 | Pance et al. ...................... 715/863 |
| 2010/0103172 A1 | 4/2010 | Purdy, Sr. ......................... 345/426 |
| 2010/0118122 A1 | 5/2010 | Hartman .......................... 348/46 |
| 2010/0309287 A1 | 12/2010 | Rodriguez ....................... 348/43 |
| 2010/0309315 A1 | 12/2010 | Hogasten et al. ................ 348/164 |
| 2011/0026039 A1* | 2/2011 | Nimmakayala et al. ........ 356/614 |
| 2011/0064327 A1 | 3/2011 | Dagher et al. ................... 382/263 |
| 2011/0074931 A1 | 3/2011 | Bilbrey et al. ................... 348/48 |
| 2011/0075055 A1 | 3/2011 | Bilbrey ............................. 348/744 |
| 2011/0115964 A1 | 5/2011 | Gere ................................. 345/342 |
| 2011/0149094 A1 | 6/2011 | Chen et al. ....................... 348/208.3 |
| 2011/0200247 A1* | 8/2011 | Ravid et al. ...................... 382/144 |
| 2011/0242286 A1 | 10/2011 | Pace et al. ........................ 348/47 |
| 2011/0317005 A1 | 12/2011 | Atkinson ......................... 348/135 |
| 2012/0044322 A1 | 2/2012 | Tian et al. ........................ 348/43 |
| 2012/0044328 A1 | 2/2012 | Gere ................................. 348/48 |
| 2012/0050490 A1 | 3/2012 | Chen et al. ....................... 348/47 |

FOREIGN PATENT DOCUMENTS

| | | |
|---|---|---|
| JP | 2002354493 A | 12/2002 |
| JP | 2003-299113 A | 10/2003 |
| JP | 2005-197792 A | 7/2005 |
| KR | 10-2007-0100890 A | 10/2007 |
| KR | 10-2009-0049343 A | 5/2009 |
| WO | WO93/11631 | 6/1993 |
| WO | WO2007/100057 A1 | 9/2007 |
| WO | WO2009/001512 A1 | 12/2008 |

OTHER PUBLICATIONS

Koschan et al., "Finding Objects in a 3D Environment by Combining Distance Measurement and Color Indexing," IEEE, vol. 1, pp. 858-861, Oct. 2001.

Sokolova et al., "Experiments in Stereo Vision," Computer Science 570, Final Project, http://disparity.wikidot.com/, 14 pages, at least as early as Jun. 16, 2010.

Stern et al., "Three-Dimensional Image Sensing, Visualization, and Processing Using Integral Imaging," *Proceedings of the IEEE*, Mar. 2006, vol. 94, No. 3, pp. 591-607.

Thomas, "An Introduction to Photo Stitching," *Eastern Suburbs Photographic Society*, 2007, 12 pages.

Wang, *Video Processing and Communications*, 2001, Prentice-Hall, Chapter 1: Video Formation, Perception, and Representation, pp. 1-32.

* cited by examiner

COMPONENT CONCENTRICITY

TECHNICAL FIELD

The present application is related to electronic devices having cameras and, more particularly, to concentricity of cameras' within apertures in electronic device housings.

BACKGROUND

Concentricity of parts visible within apertures of electronic device housings contribute to product appeal. Generally, the more centered a part is, the more appealing the product is. Quality control efforts regarding the concentricity of parts, such as a camera, have previously been based on visual evaluation. The results of such evaluations have been inconsistent.

SUMMARY

In some embodiments, a method for determining the concentricity of a camera mounted within an aperture of an electronic device housing is provided. The method includes obtaining an image of a camera mounted within the aperture of the housing and identifying a plurality of circular shapes within the image using a processor. One of the circular shapes represents the aperture in the housing and the other circular shape represents the camera. An offset between two of the circular shapes is calculated.

In some embodiments, a system for determining the concentricity of a component relative to an aperture in a housing of an electronic device is provided. The system includes a processor and a memory coupled to the processor. The memory stores instructions executable by the processor to calculate the concentricity. The system also includes a camera configured to capture an image of the component within the aperture and provide the image to the processor. The image is processed by the processor to discern the shape of the aperture and the shape of the component, and determine a concentricity therebetween.

In some embodiments, a method for determining a concentricity of a camera is provided. The method includes capturing an image of a camera mounted within an aperture of a housing and processing the image. An edge of an outer circular shape is determined, as is an edge of an inner circular shape. The inner circular shape is circumscribed by the outer circular shape. A concentricity value of the inner circular shape relative to the outer circular shape is computed.

DETAILED DESCRIPTION

Certain embodiments take the form of methods and/or systems related to automated processes for determining concentricity of a camera within an aperture of an electronic device housing. In particular, in some embodiments, a method is provided for determining concentricity by obtaining an image of the camera within the aperture of the housing and processing the image to identify a plurality of circular shapes within the image. Concentricity is then determined based on the relative location of at least two of the plurality of circular images. Generally and as used herein, "concentricity" refers to the degree to which the center of a component is also the center of the aperture (e.g., how close to being centered within the aperture the camera is). Ideally, the camera is sufficiently centered that an offset is not discernible to user.

In some embodiments, a process for determining concentricity may include capturing an image of the camera, as mounted within the aperture, and discerning an outer circular shape and an inner circular shape. A centroid for each of the outer and inner circular shapes is determined. A distance between the two centroids may be computed and may be used to calculate a concentricity value.

In some embodiments, the concentricity value may be determined based on a ratio of a maximum distance and a minimum distance from the edges of the inner circle to the outer circle. That is, in some embodiments, a maximum distance between an edge of the inner circle to the outer circle is found, as is a minimum distance from the edge of the inner circle to the outer circle. The maximum value and the minimum values are expressed as a ratio indicative of the concentricity of the camera. The closer the value is to 1, the more concentric, or better centered, the camera is within the aperture.

Figure 1:
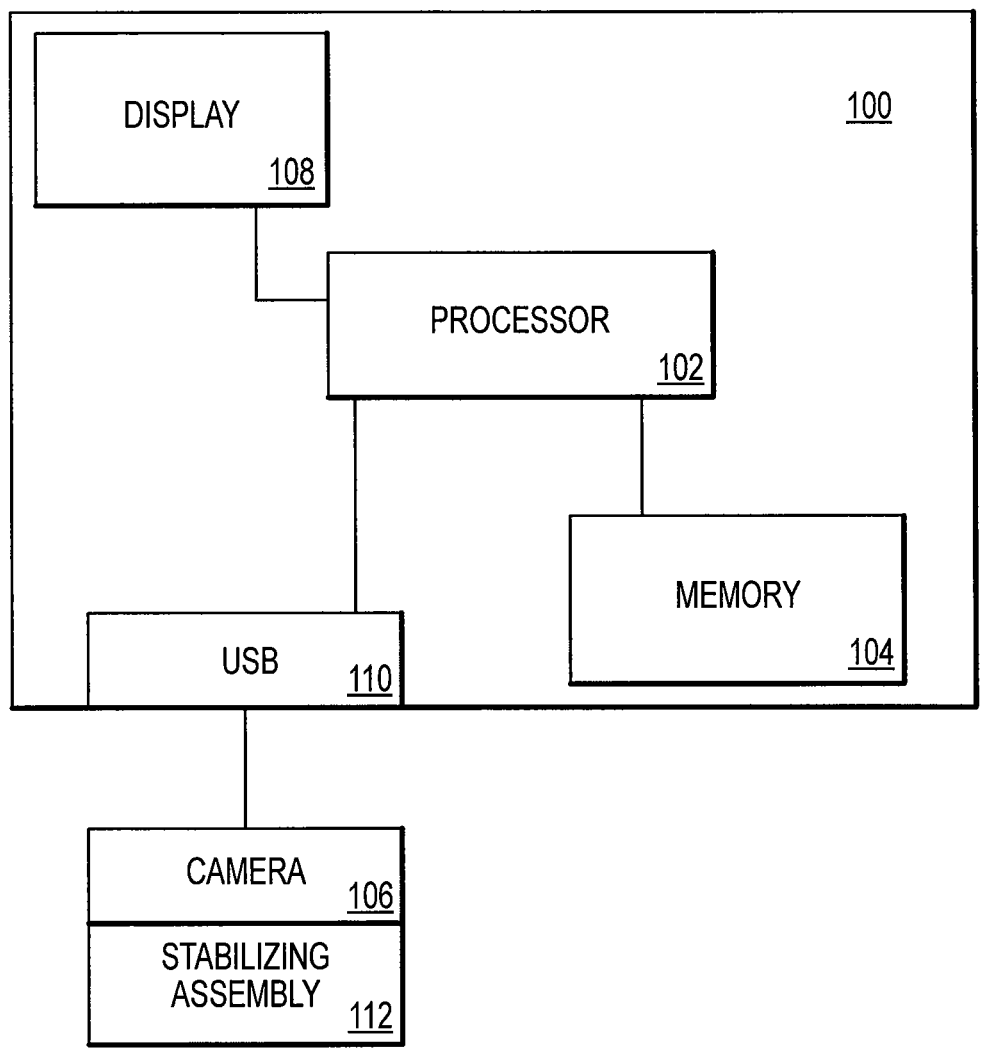
FIG. 1 is a block diagram of a system configured to determine concentricity of a component mounted within an aperture of an electronic device housing.

Referring to the drawings and turning initially to FIG. 1, a computer system 100 is illustrated that may be implemented to determine the concentricity of a camera. The system 100 includes a processor 102, a memory 104, a camera 106 and a display 108. The processor 102 may include one or more suitable processors and each processor may include one or more processing cores. The memory 104 is coupled to the processor 102 and may be configured to store executable instruction and data for the use by the processor 102. In particular, the memory 104 may store instructions and data related to computing the concentricity of the camera. The memory 104 may be implemented in one or more common memory platforms such as random access memory, flash, and so forth.

The camera 106 may be external to a housing of the system 100. In some embodiments, the camera 106 may be communicatively coupled to the processor 102 via a universal serial bus (USB) connection 110, or other suitable connection. In some embodiments, the camera 106 may include fiber optic cables that couple to a sensor positioned with the housing of the system 100. The camera 106 is coupled to a stabilizing apparatus 112 that is configured to hold the camera 106 over the aperture when the camera is capturing an image. The display 108 may also be coupled to the processor 102 and may be configured to display the captured image, the circular shapes, the concentricity value, and/or other graphics.

Figure 2:
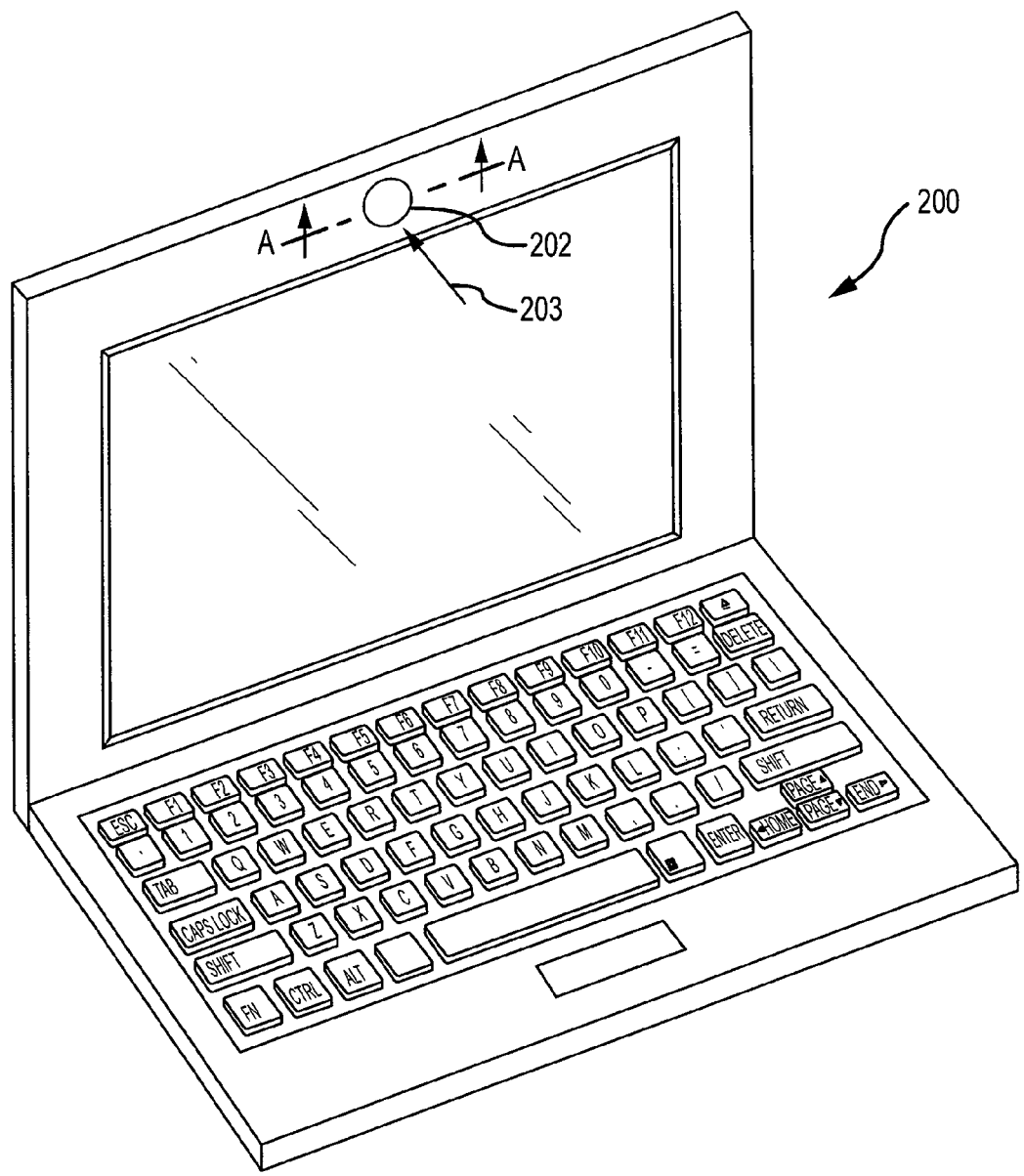
FIG. 2 illustrates an example electronic device having a component mounted within an aperture of its housing.

FIG. 2 illustrates an example electronic device 200 that may have a camera mounted in an aperture 202. As one example, the electronic device 200 may be a notebook computer. In other examples, the electronic device may be a camera (digital or analog), a mobile telephone, a tablet computer, a portable digital file player and/or recorder, and the like. Generally, the camera 106 may be secured directly over the aperture 202 to capture an image of the aperture and the visible components under the aperture. As such, the camera 106 obtains an image generally perpendicular to the housing, represented by arrow 203.

Figure 3:
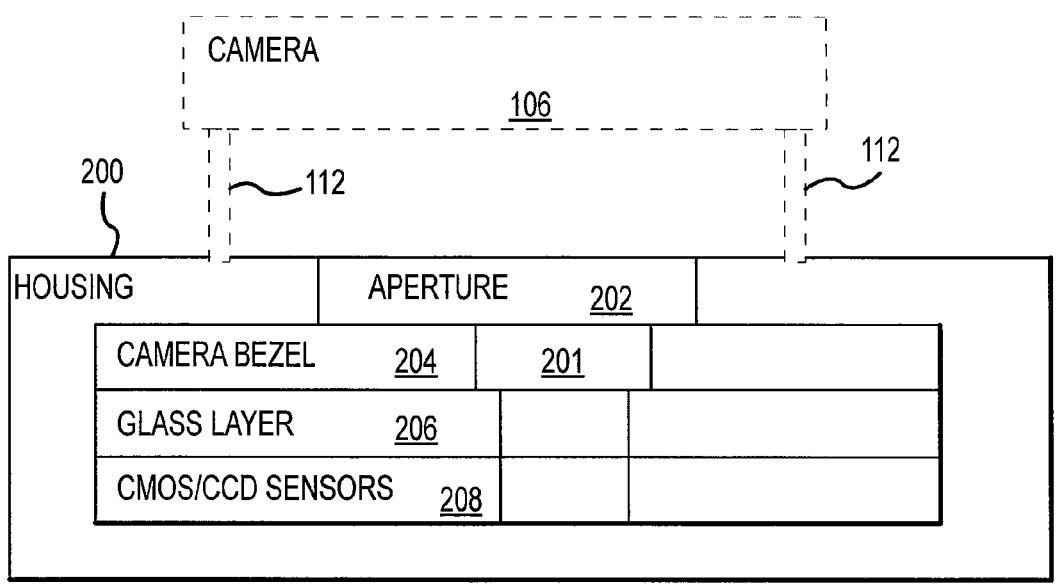
FIG. 3 is a partial cross-sectional, block view of the component taken along Line AA, and a camera external to the component and housing.

FIG. 3 is a partial cross-sectional view of the device 200 near the aperture 202, taken along line A-A to show some of the various layers that may be located under the aperture 202. In this example, the camera 201 mounted under the aperture 202 may include a bezel 204, a glass layer 206, and a sensor 208. The glass layer 206 may include one or more lens layers and/or one or more protective glass layers. In some embodiments, an additional glass layer may be provided over the bezel 204. Additionally, in some embodiments, one or more layers of the glass layer 206 may be supported by and or coupled to the bezel 204 and/or the sensor 208. The sensor layer 208 may include a light sensor used for capturing images. For example, the sensor 208 may include a complementary metallic-oxide semiconductor sensor, a charged coupled device sensor, or the like.

Additionally, FIG. 3 shows the camera 106 and stabilizing apparatus 112 (in dashed lines, as it would ordinarily not be visible in the cross-section of FIG. 3) positioned over the aperture 202. This illustrates where the camera 106 may be located to capture an image of the aperture 202 and camera 201. The stabilizing apparatus 112 may be used to provide a consistent distance and positioning of the camera 106 relative to the apertures of various devices that may be tested, thus providing consistency and repeatability in the concentricity measurements.

Figure 4:
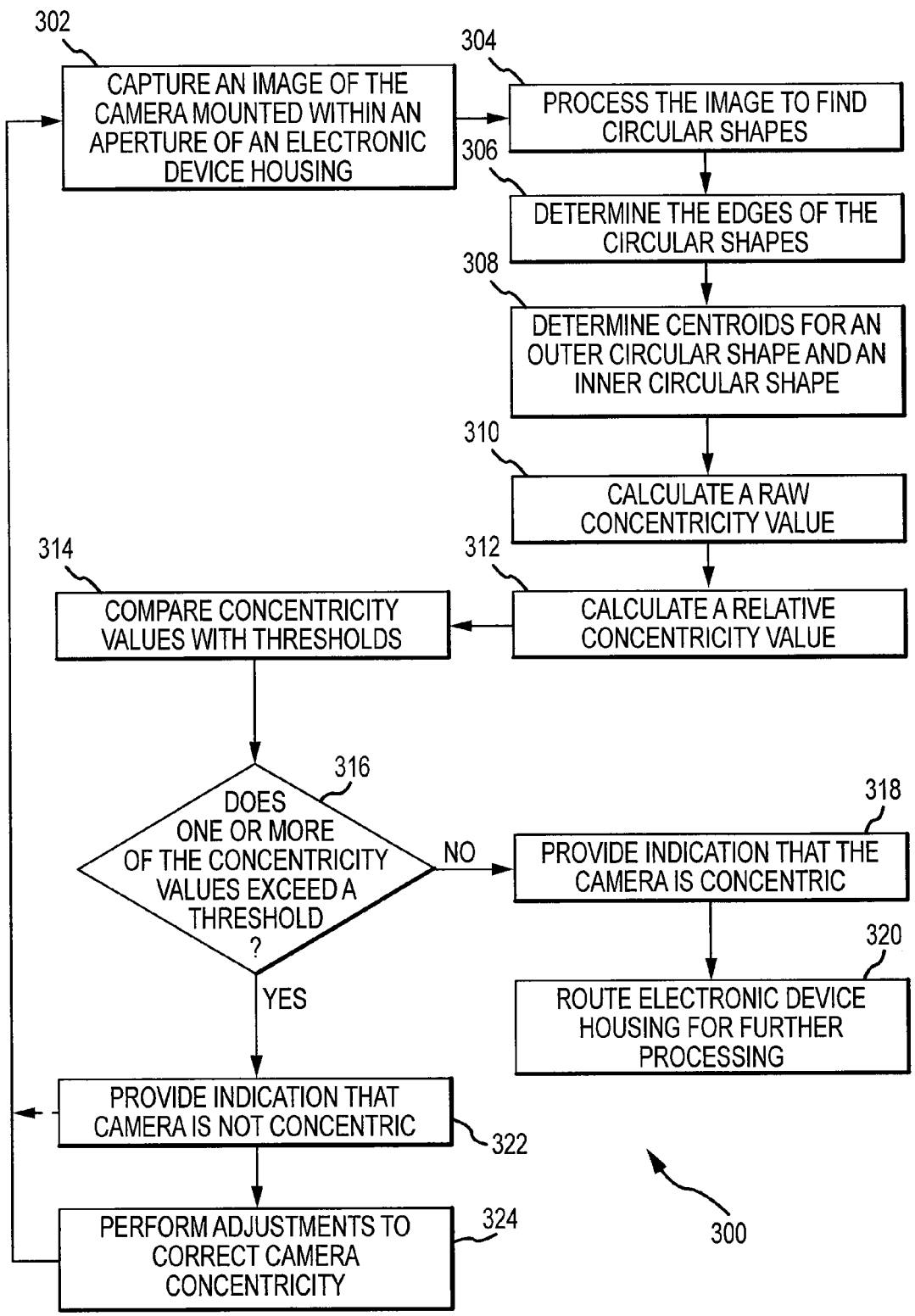
FIG. 4 is a flowchart illustrating an example process for determining concentricity values for a component mounted within an aperture of an electronic device housing.

Turning to FIG. 4, a flowchart 300 illustrating an example process for determining concentricity is illustrated. The process may begin by capturing or obtaining an image of the camera mounted within the aperture (Block 302). The image is then processed to find circular shapes within the image (Block 304). Edges of the circular shapes are determined (Block 306). In some embodiments, filters may be applied to the image to remove a background from the image and/or focus on the aperture and circular objects circumscribed therein, as discussed in greater detail below. Additionally, in some embodiments, the image may be scaled using the circular shape of the aperture as a benchmark for scaling, as the aperture may have a tolerance of +0.03-0.02 mm. The scaling of the image helps to standardize the evaluation of the concentricity, as the circular shapes are used to determine the concentricity of the camera within the aperture.

In some embodiments, an outer circular shape may be determined and then an inner circular shape may be found within the outer circular shape. It should be appreciated that in some instances multiple circular shapes may be found within the outer circular shape. Generally, a first circular shape moving inwardly from the outer circular shape may be used for concentricity calculation purposes, although other circular shapes may also or alternatively be used. One of the plurality of circular shapes found in the image may be presumed to represent the aperture 202 and one or more circular shapes may be presumed to represent one or more layers of the camera 201. The multiple circular shapes may include one or more layers of the camera assembly, such as a bezel or housing of the camera, one or more lenses for the camera, and so forth. A concentricity of the camera may be found by determining an offset of the one or more circular shapes from the aperture 202. The offset may be determined and represented in several different ways. The determination of concentricity will be described in greater detail below.

In one embodiment, the concentricity may be represented by a raw offset of the centroids of the circular shapes. As such, the centroids of the circular shapes are determined (Block 308) and then an offset of the centroids is calculated as a raw concentricity value (Block 310). Specifically, once the inner and outer circular shapes are determined, a distance between their centroids is determined. In some embodiments, the distance may be measured in inches, millimeters, or pixels, for example. As can be appreciated, a smaller distance between the centroids indicates more concentric circles.

Additionally, in some embodiments the concentricity may be represented by a relative concentricity value (Block 312). In some embodiments, the relative concentricity value may be calculated as a ratio of a maximum distance and a minimum distance between edges of the circular shapes. It should be appreciated, that in some embodiments, either the raw measurement or the relative measurement may be implemented without the other.

In some embodiments, the concentricity values may be compared against thresholds (Block 314). The thresholds may be based on an acceptable variance range, such as up to 0.03 mm for the raw measurements. In other embodiments, the thresholds may be determined based on empirical determinations as to what appears to be acceptable or concentric. As may be appreciated, the concentricity thresholds may vary based on the relative sizes of the circles, as well as the size of the housing relative to the circles. Upon comparing with the thresholds, it may be determined whether one or more of the concentricity values exceed a threshold (Block 316). If no threshold is exceeded, an indication that the camera is concentric may be provided (Block 318) and the electronic device housing may be routed for further processing (Block 320). Alternatively, if one or more of the concentricity values exceeds a threshold, an indication may be provided that the camera is not concentric (Block 322) and adjustments may be performed to correct the camera concentricity (Block 324). In some embodiments, adjustments may be made to the camera 106 that captures the images of the circles, the housing 200, or the camera within the housing. Additionally, in some embodiments, upon providing an indication that the camera is not concentric, the process may be repeated without making any adjustments. A determination may be made based on the comparison to the thresholds (Block 316).

To find circular shapes within the obtained image, known image processing techniques may be applied to the image to find edges of the shapes. For example, in one embodiment, characteristics such as color, darkness, and so forth, of adjacent pixels in the image may be compared to determine where an edge occurs. As one example, if one pixel is found to be significantly darker than an adjacent pixel during the comparison of adjacent pixels, it may indicate that the pixels represent an edge of a shape.

In some embodiments, one or more filters may be applied to help to neutralize and/or eliminate the background (e.g., the housing 200 and any surrounding details captured by the camera) so that it does not impact the determination and treatment of the circular shapes. Specifically, a threshold for a filter may be set that corresponds to characteristics of the housing to create a binary image with the circular shapes being revealed and the housing being essentially eliminated. For example, in some embodiments, the housing 200 may have a lighter color, such as white or aluminum, such that the color of the housing allows dictates a threshold setting that renders the housing as featureless white space in a captured image. Thus, this background is essentially eliminated. In other embodiments, the housing may have a darker color, such as black, that may require a more nuanced filter and/or a higher threshold so that the circular shapes may be discerned, as the camera components generally may appear as a dark color.

Additionally, in some embodiments, the area of the aperture may be used to help filter the image. In particular and as discussed above, the area of the aperture may be known within a relatively small threshold. Thus, the image may be scanned for a circular shape that is within the threshold limits of the known value. The found circular shape may be assumed to be the aperture. Once found, the image may be searched within the area circumscribed by the found circular shape to the exclusion of portions of the image outside the circular shape. In some embodiments, the image may be searched inwardly from the found circular image for an inner circular shape (e.g., the next largest circular shape circumscribed within the circular shape). That is, for example, the image may be searched from a left-most edge of the found circular shape until it reaches an edge of another circular shape.

Figure 5:
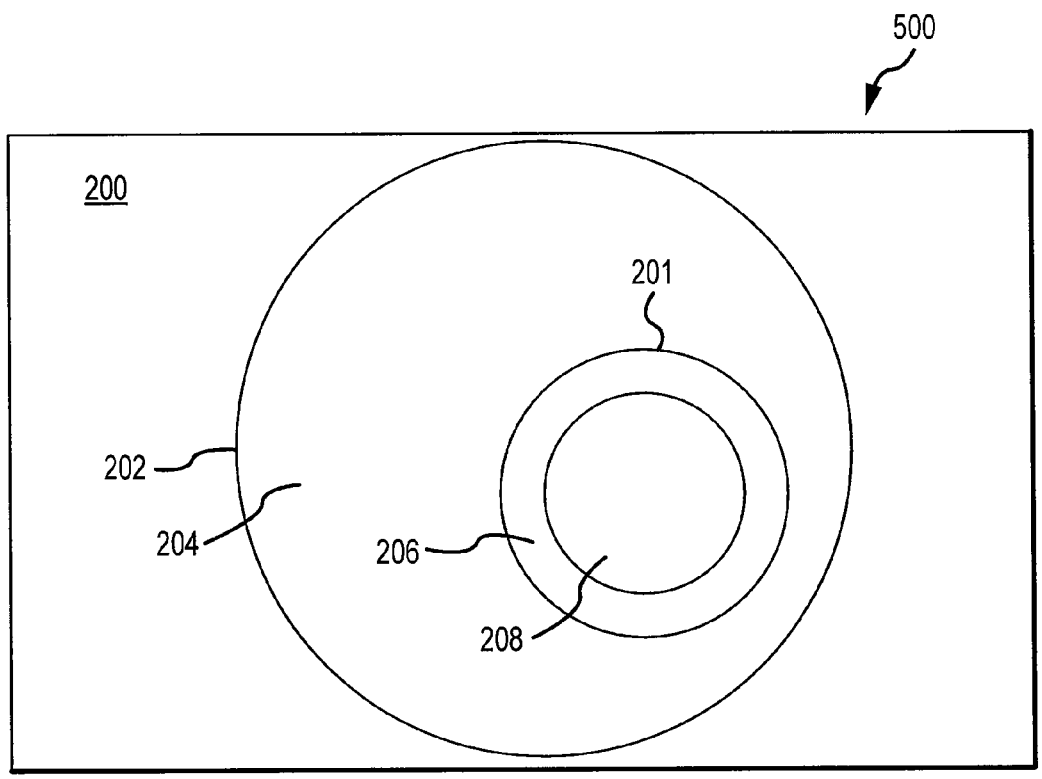
FIG. 5 illustrates an example image of the component mounted within the aperture of the electronic device housing of FIG. 2.

FIG. 5. illustrates an example image 500 that may be captured by the camera 106 when positioned over the aperture 202, as illustrated in FIG. 3. The image 500 shows the housing 200, the aperture 202, the bezel 204 of the camera 201, the glass layer 206, and the sensor 208. Each of the aperture 202, the bezel 206, and the sensor 208 may have a circular shape as viewed from the camera 106. In some cases, circular shapes from the various layers of the camera 201 may not be concentric. However, in some embodiments, a first circular shape of the camera 201, moving inwardly from the outer circular shape of the aperture 202, is used for the concentricity determination, as it is larger than the other circular shapes and therefore may have a greater bearing on the aesthetics than the other circular shapes. In some embodiments, the first circular shape may be a circular shape defined by the camera bezel 204.

The circular shapes in the image 500 are processed to determine their concentricity. As mentioned above, the concentricity may be a raw measurement, such as the distance between centroids of the circular shapes, or it may be a relative measurement, such as calculating a ratio between maximum and minimum distances from the edges of the inner circle to the outer circle.

Generally, the image 500 may be processed on as an x-y coordinate grid, where the x-axis is the horizontal axis and the y-axis is the vertical axis. The centroids of the circular shapes may be determined by taking an average of the columns and rows for each circular shape. For the purposes of this discussion and the following example, the units of the x- and y-axis may be arbitrary. However, in some embodiments, the units may take the form or inches, millimeters, pixels, and the like.

Figure 6:
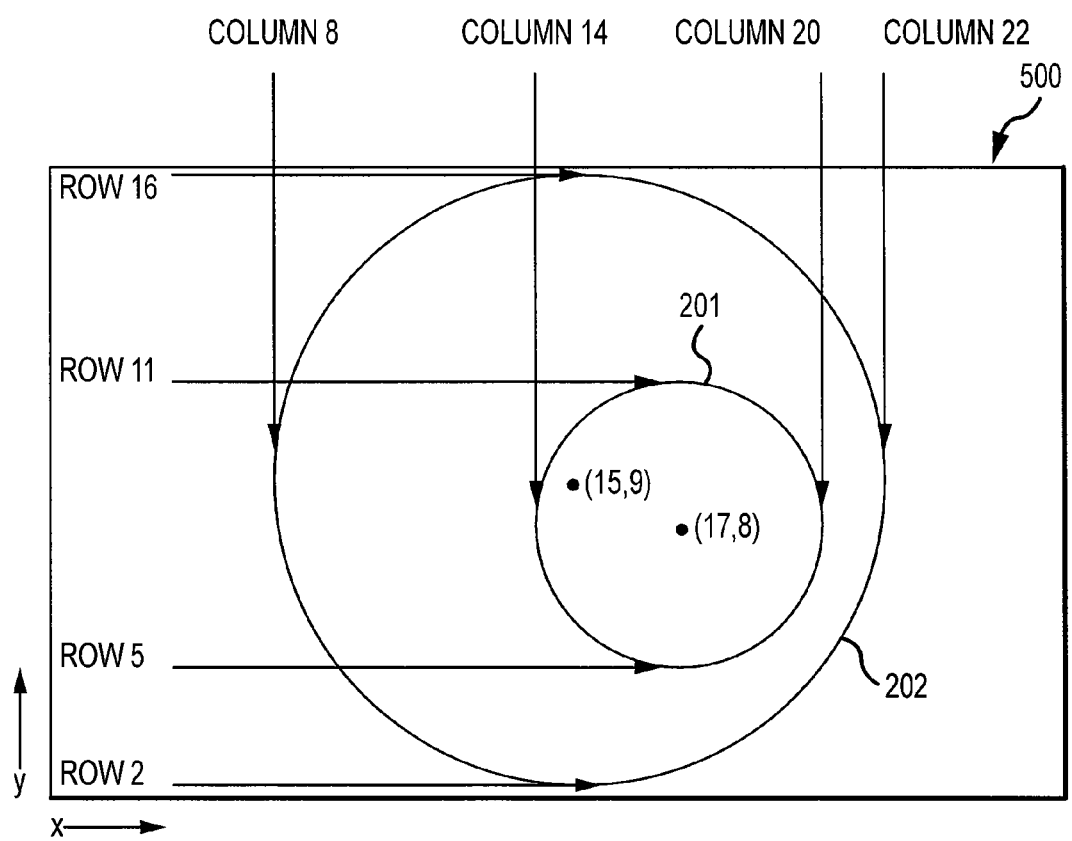
FIG. 6 illustrates the image of FIG. 5 after filtering and after the edges of circular shapes found in the image.

Referring to FIG. 6, the circular shape for the aperture 202 may start at column 8 and end at column 22. Thus, the average would be 15 (e.g., (8+22)/2=15). Similarly, if the circular shape for the aperture starts at row 2 and ends at row 16, the average would be 9 (e.g., (2+16)/2=9). Thus, on an x-y grid, the centroid ($x_1$, $y_1$) would be located at (15, 9). As another example, the centroid of the circular shape defined by the bezel 204 may have a start column of 14 and an end column of 20, and a start row of 5 and an end row of 11. Thus, the centroid ($x_2$, $y_2$) is located at (17, 8).

In another embodiment, the column address values of all the pixels of the circular region are summed and then divided by the total number of columns that make up the circular region. The result is the x location (in pixels) of the center of the circular region. The process is repeated for the rows to determine the y-location of the center of the circular region. This embodiment may provide more robust results for instances where the image of the circles are ragged.

In addition to the centroids, the radius and diameter of the circular shapes may also be determined. It should be appreciated that the diameter and the radius may be determined in a variety of different ways. For example, the difference between the centroid and one of the start or end row or columns is the radius and the diameter is the difference between the start and end of the row or column respectively. Specifically, the radius ($r_1$) of the aperture is 7 (e.g., 15−8=7). The diameter of the aperture is 14 (e.g., 22−8=14). The radius ($r_2$) of the bezel is 3 (e.g., 17−14=3). Additionally, the radius and diameter may be determined relative to the other once one is known, as the diameter is twice the radius.

In another embodiment, the radius (e.g., in pixels) is set equal to the square root of A/pi, where A is the total number of pixels in the circular region, and pi is the ratio of the circumference of a circle to its diameter (i.e., 3.141592-654 . . . ).

Figure 7:
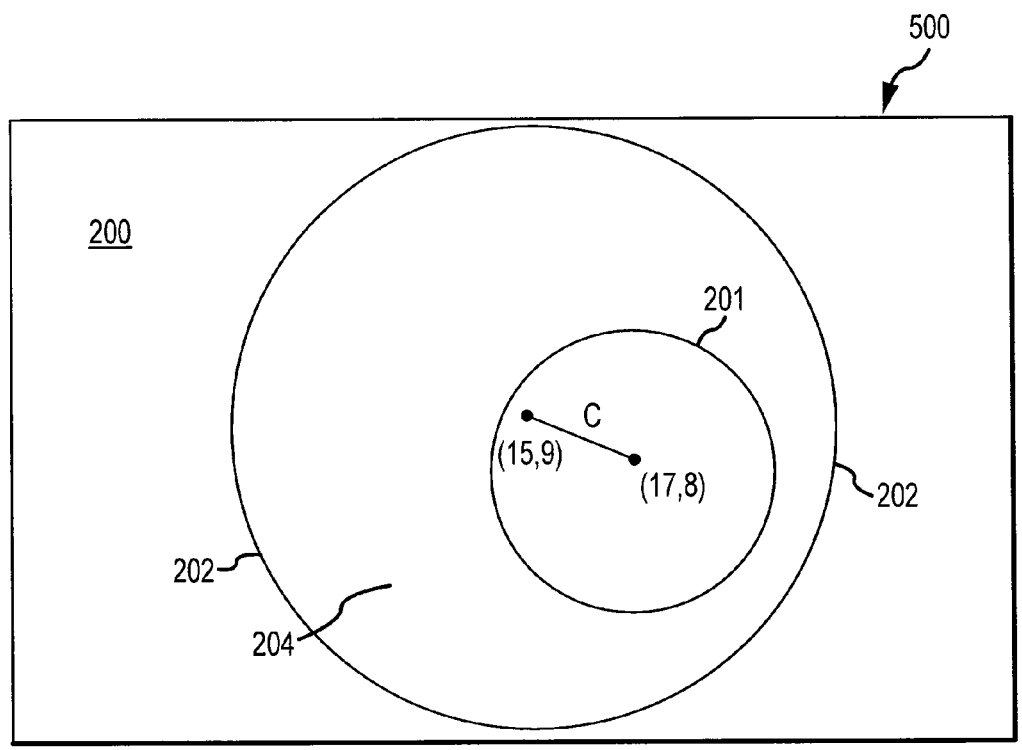
FIG. 7 illustrates a raw concentricity value based on the offset of the centroids of the circular shapes of the image of FIG. 5.

The centroids, radii, and diameters may be used to determine the raw concentricity and relative concentricity of the circular shapes. The raw concentricity may be represented by "C", as shown in FIG. 7. For determining a raw concentricity C, the difference between the centroids is determined. As such, the raw concentricity C is determined by the equation, $C^2=(x_1-x_2)^2+(y_1-y_2)^2$. Using the numbers from the previous example, the raw concentricity C value would be $\sqrt{((15-17)^2+(9-8)^2)}=\sqrt{5}$.

Figure 8:
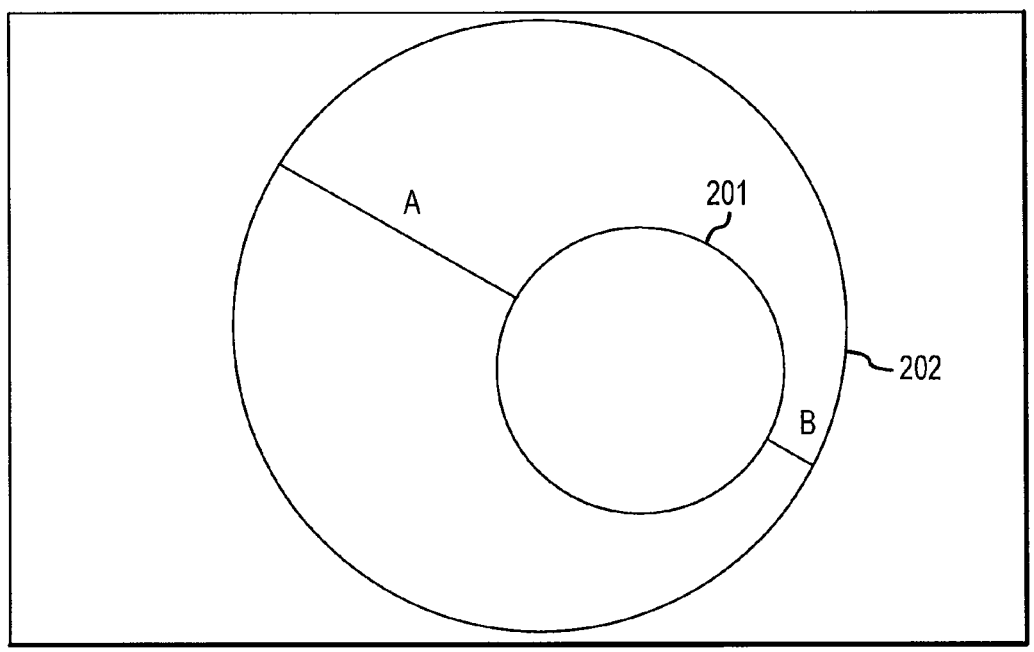
FIG. 8 illustrates a maximum distance A and a minimum distance B between edges of first and second circular shapes of the image of FIG. 5 for the determination of a relative concentricity value.

The computation of the relative concentricity is based on a determination of the maximum and minimum distances between outer circular shape 202 and inner circular shape 201. For convenience, as illustrated in FIG. 8, the maximum distance may be represented by "A" and the minimum distance may be represented by "B." The maximum distance A may be computed by the equation:

$A=r_1-r_2+C$ (in this example, $A=7-3+\sqrt{5}$);

and the minimum distance may be computed by the equation:

$B=r_1-r_2-C$ (in this example, $B=7-3-\sqrt{5}$).

The relative concentricity is a ratio of A and B. As such, in one embodiment, the relative concentricity may be A/B or another ratio that may be constructed to represent the relative position of the circular shapes. In some embodiments, such as in the case of the ratio of A/B, the closer the ratio is to 1 is indicative of more concentric circular shapes.

The concentricity values, once computed, may be outputted to a display or otherwise provided so that decisions may be made relative to quality control. In some embodiments, both the raw and relative concentricity measurements may be outputted, while in other embodiments, only one of the concentricity measurements may be outputted. Additionally, the concentricity measurements may be compared against a threshold representative of acceptable concentricity values. For example, a raw concentricity value greater than two may be determined to be unacceptable. As such, a threshold of two may be set and a raw concentricity value greater than two may set a user alert that the threshold has been exceeded. A user may then take appropriate action, such as manipulating the camera positioning within the housing, routing the device for correction of the camera concentricity, and so forth. In some embodiments, a determination of non-concentricity may be the result of misalignment of the camera 106. As such, in some embodiments, the user may manipulate the camera into a proper position and repeat the testing for concentricity. In some embodiments, the manipulation may be an automated process completed through mechanical or robotic devices. After manipulation, the concentricity may again be determined.

Although the present disclosure has been described with respect to particular systems and methods, it should be recognized upon reading this disclosure that certain changes or modifications to the embodiments and/or their operations, as described herein, may be made without departing from the spirit or scope of the invention. Indeed, one or more of the techniques described herein may be implemented in whole or in part and may be combined with one or more of the other techniques disclosed herein. Additionally, it should be appreciated, that the techniques disclosed herein may be applicable beyond the specific examples described above. For example, concentricity may be determined for a variety of optical oriented devices such as viewfinders or binoculars. Additionally, concentricity may be determined for the placement of displays, buttons, and so on, within a housing. Further, applications may be found in other areas such as picture frames and matting. As such, it should be appreciated that the scope may extend to non-circular objects as well.

The invention claimed is:

1. A method for determining concentricity of a camera mounted within an aperture of an electronic device housing, the method comprising:
    obtaining an image of a camera mounted within the aperture of the housing;
    identifying a plurality of circular shapes within the image using a processor;
    determining an offset between two of the plurality of circular shapes, wherein one of the circular shapes comprises the aperture in the housing and the other circular shape represents the camera, by:
        determining a maximum distance between edges of the two circular shapes;
        determining a minimum distance between edges of the two circular shapes; and
        calculating a ratio of the maximum and minimum distances.

2. The method of claim 1, wherein the ratio comprises the maximum distance over the minimum distance.

3. The method of claim 1, wherein the ration comprises the minimum distance over the maximum distance.

4. The method of claim 1 further comprising applying filters to the obtained image.

5. The method of claim 4, wherein applying filters comprises applying a threshold to create a binary image.

6. The method of claim 5 wherein the threshold is calibrated to eliminate a background from the image.

7. A method for determining a concentricity of a camera comprising:
    capturing an image of a camera mounted within an aperture of a housing;
    providing the image to a processor for processing;
    discerning an edge of an outer circular shape;
    discerning an edge of an inner circular shape, the inner circular shape circumscribed by the outer circular shape; and
    computing a concentricity value of the inner circular shape relative to the outer circular shape by computing a ratio of a maximum distance and a minimum distance from the edge of the inner cicular shape and the edge of the outer circular shape.

8. The method of claim 7, wherein discerning the edges of the outer circular shape and the inner circular shape comprises comparing characteristics of adjacent pixels to determine if differences between the characteristics exceed a threshold level.

9. The method of claim 7 comprising:
    comparing the concentricity value to a threshold; and
    setting a user alert if the concentricity value exceeds the threshold.

10. A method for determining concentricity of a camera mounted within an aperture of an electronic device housing, the method comprising:
    obtaining an image of a camera mounted within the aperture of the housing;
    identifying an aperture circular shape within the image, representing the aperture in the housing, including identifying an aperture set of pixels that includes each pixel within the aperture circular shape;
    identifying a camera circular shape within the image, representing the camera, including identifying a camera set of pixels that includes each pixel within the camera circular shape;
    calculating an aperture centroid by:
        averaging the rows of the aperture set of pixels; and
        averaging the columns of the aperture set of pixels;
    calculating a camera centroid by:
        averaging the rows of the camera set of pixels; and
        averaging the columns of the camera set of pixels;
    determining an offset between the aperture circular shape and the camera circular shape from the aperture centroid and the camera centroid.

11. The method of claim 10, wherein:
identifying the aperture circular shape within the image includes:
    discerning an aperture edge in the image; and
    identifying pixels in the aperture edge and pixels surrounded by in the aperture edge as the aperture set of pixels; and
identifying the camera circular shape within the image includes:
    discerning a camera edge in the image; and
    identifying pixels in the camera edge and pixels surrounded by in the camera edge as the camera set of pixels.

12. The method of claim 11, wherein:
discerning the aperture edge includes comparing characteristics of adjacent pixels to determine if differences between the characteristics exceed an aperture threshold level; and
discerning the camera edge includes comparing characteristics of adjacent pixels to determine if differences between the characteristics exceed a camera threshold level.

13. The method of claim 10, further comprising:
comparing the offset between the aperture circular shape and the camera circular shape to a threshold; and
setting a user alert if the offset between the aperture circular shape and the camera circular shape exceeds the threshold.

* * * * *